(12) United States Patent
Brewer et al.

(10) Patent No.: US 7,418,531 B2
(45) Date of Patent: Aug. 26, 2008

(54) QUALITY OF SERVICE FOR DATA STORAGE VOLUMES

(75) Inventors: Michael Allan Brewer, Boulder, CO (US); David Alan Burton, Vail, AZ (US); Michael Lee Workman, Saratoga, CA (US)

(73) Assignee: Pillar Data Systems, Inc., San Jose, CA (US)

( * ) Notice: Subject to any disclaimer, the term of this patent is extended or adjusted under 35 U.S.C. 154(b) by 297 days.

(21) Appl. No.: 11/122,495

(22) Filed: May 4, 2005

(65) Prior Publication Data

US 2006/0253621 A1  Nov. 9, 2006

(51) Int. Cl.
 *G06F 3/00* (2006.01)
 *G06F 12/00* (2006.01)
(52) U.S. Cl. ......................................... 710/36; 711/100
(58) Field of Classification Search ........................ None
 See application file for complete search history.

(56) References Cited

U.S. PATENT DOCUMENTS

| | | | |
|---|---|---|---|
| 5,140,683 A | 8/1992 | Gallo et al. | |
| 5,548,795 A | 8/1996 | Au | |
| 5,729,718 A | 3/1998 | Au | |
| 5,761,692 A | 6/1998 | Ozden et al. | |
| 6,078,998 A | 6/2000 | Kamel et al. | |
| 6,496,899 B1 | 12/2002 | DeMoney | |
| 6,745,262 B1 | 6/2004 | Benhase et al. | |
| 6,795,894 B1 * | 9/2004 | Neufeld et al. | 711/113 |
| 6,829,678 B1 | 12/2004 | Sawdon et al. | |
| 7,260,634 B2 * | 8/2007 | Furukawa et al. | 709/226 |
| 2004/0255055 A1 | 12/2004 | Lamberts | |
| 2005/0066138 A1 | 3/2005 | Horn et al. | |
| 2005/0206538 A1 * | 9/2005 | Blaum et al. | 341/50 |

OTHER PUBLICATIONS

A sensible customer approach: Pillar Customer Service. Designed around one customer. You, copyright 2005, Pillar Data Systems, Inc., US.

A sensible storage alternative: Pillar Axiom (TM) Storage System, copyright 2005, Pillar Data Systems, Inc., US.

From a market need comes an idea: A sensible storage alternative: Pillar Axiom (TM) Storage System, copyright 2005, Pillar Data Systems, Inc., US.

(Continued)

*Primary Examiner*—Alan Chen
(74) *Attorney, Agent, or Firm*—Robert Moll

(57) ABSTRACT

The invention classifies volumes (e.g., file systems or LUNs) of a data storage system according to application requirements and allocates space for the volumes on storage devices (e.g., hard disk drives) accordingly. A person such as an IT administrator configures the volumes specifying size, type (e.g., file system or SAN LUN), and priority (e.g., high, medium, low, or archive). The host schedules I/O requests to the storage devices in priority queues using the volume definition to match the application requirements and reduce storage seek time between volumes of different priorities. The host also allocates high performance bands of the storage devices to high performance applications and lower performance bands to lower performance applications. In this manner, the data storage system places data on the band of the storage device that best supports its performance needs.

22 Claims, 8 Drawing Sheets

OTHER PUBLICATIONS

Corporate Backgrounder - Pillar (TM) Data Systems, copyright 2005, Pillar Data Systems, Inc., US.

Datasheet - Slammer Storage Controller, Pilot Policy Controller, Pillar Axiom (TM) Storage System, copyright 2005, Pillar Data Systems, Inc., US.

Datasheet - Brick Storage Enclosures, Pillar Axiom (TM) Storage System, copyright 2005, Pillar Data Systems, Inc., US.

Datasheet - Axiom File Replicator, Pillar Axiom (TM) Storage System, copyright 2005, Pillar Data Systems, Inc., US.

* cited by examiner

User System Configuration

Enter your Type, Capacity and Priority for the Volume (e.g., File system or LUN)

| Volume Type | Capacity | Priority of Volume |
|---|---|---|
| ✓ NAS | 10 GB | High ▼ |
| ☐ SAN | | |

FIGURE 2

QUALITY OF SERVICE FOR DATA STORAGE VOLUMES

BACKGROUND

The present invention relates to quality of service for data storage volumes.

This application incorporates by reference herein as follows:

U.S. application Ser. No. 10/264,603, Systems and Methods of Multiple Access Paths to Single Ported Storage Devices, filed on Oct. 3, 2002, now abandoned;

U.S. application Ser. No. 10/354,797, Methods and Systems of Host Caching, film on Jan. 29, 2003, now U.S. Pat. No. 6,965,979 B2;

U.S. application Ser. No. 10/397,610, Methods and Systems for Management of System Metadata, filed on Mar. 26, 2003, now U.S. Pat. No. 7,216,253 B2;

U.S. application Ser. No. 10/440,347, Methods and Systems of Cache Memory Management and Snapshot Operations, filed on May 16, 2003, now U.S. Pat. No. 7,124,243 B2;

U.S. application Ser. No. 10/600,417, Systems and Methods of Data Migration in Snapshot Operations, filed on Jun. 19, 2003, now U.S. Pat. No. 7,136,974 B2;

U.S. application Ser. No. 10/616,128, Snapshots of File Systems in Data Storage Systems, filed on Jul. 8, 2003, now U.S. Pat. No. 6,959,313 B2;

U.S. application Ser. No. 10/677,560, Systems and Methods of Multiple Access Paths to Single Ported Storage Devices, filed on Oct. 1, 2003, now abandoned;

U.S. application Ser. No. 10/696,327, Data Replication in Data Storage Systems, filed on Oct. 28, 2003, now U.S. Pat. No. 7,143,122 B2; and U.S. application Ser. No. 10/637,322, Guided Configuration of Data Storage Systems, filed on Apr. 30, 2004, now U.S. Pat. No. 7,216,192 B2.

U.S. application Ser. No.10/975,290, Staggered Writing for Data Storage Systems, filed on Oct. 27, 2004; and U.S. application Ser. No. 10/976,430, Management of I/O Operations In Data Storage Systems, filed on Oct. 29, 2004, now U.S. Pat. No. 7,222,223 B2.

The Internet, e-commerce, and relational databases have all contributed to a tremendous growth in data storage requirements, and created an expectation that the data must be readily available all of the time. The desire to manage data growth and produce high data availability has encouraged development of storage area networks (SANs) and network-attached storage (NAS).

SANs move networked storage behind the host, and typically have their own topology and do not rely on LAN protocols such as Ethernet. NAS frees storage from its direct attachment to a host. The NAS storage array becomes a network addressable device using standard Network file systems, TCP/IP, and Ethernet protocols. However, SANs and NAS employ at least one host connected to data storage subsystems containing the storage devices. Each storage subsystem typically contains multiple storage nodes where each node includes a storage controller and an array of storage devices usually magnetic disk (hard disk drive) or magnetic tape drives.

In data storage systems, a host makes I/O requests (i.e., reads and writes) of the data storage subsystems. Each application that is the subject of the I/O request may require different quality of service (QoS). For efficiency each host can accumulate a batch of I/O requests from application users and transmit them to the data storage subsystem.

When the host receives I/O requests, it should process the higher priority requests before the lower priority I/O requests despite the problem that I/O requests arrive at the host without regard to priority. For example, the host should ensure a higher quality of service NAS file system or SAN LUN is not given lower priority than a lower QoS file system or LUN and retain the ability to configure file systems and SAN LUNs by different QoS.

The host must ensure all I/O requests are completed in a reasonable time and must support many applications simultaneously while delivering the appropriate performance to each. It would be helpful if the number of priority levels could be easily modified to allow for different priorities (e.g., two or more) to allow for better tuning of the system. The maximum number of I/O requests allowed per priority level could be then determined through testing and some qualitative analysis of different workloads.

SUMMARY OF THE INVENTION

The invention supports classification of volumes (e.g., file systems or LUNs) of a data storage system according to application requirements and allocates space for the volumes on storage devices (e.g., hard disk drives) accordingly. A person such as an IT administrator defines the volumes specifying size, type (e.g., file system or SAN LUN), and priority (e.g., high, medium, low, or archive). The invention schedules I/O requests to the storage devices using the volume definition to match the application requirements and reduce storage seek time between volumes of different priorities.

This invention allows an IT administrator to use the higher performance bands of storage for high performance applications and the remaining capacity of the storage devices for lower performance application. By allocating space in this manner, the data storage system places data on the storage device to support performance needs. In an embodiment, by controlling the scheduling of I/O requests, the data storage system allocates I/O request bandwidth according to user preferences and avoids poor performance caused by seeks across the different performance bands.

To retain the high performance of the outer band, the data storage system limits seek activity to other bands. In addition, the data storage system schedules I/O requests according to priority to enforce the allocation of I/O request bandwidth selected by the customer. To achieve these objectives, the data storage system queues I/O requests by priority and selects I/O requests to send to the data storage subsystems according to target percentages of use.

BRIEF DESCRIPTION OF THE DRAWINGS

FIG. 2 illustrates a display of a user interface for configuration of volumes.

DETAILED DESCRIPTION OF THE PREFERRED EMBODIMENTS

The following description includes the best mode of carrying out the invention, illustrates the principles of the invention, uses illustrative values, and should not be taken in a limiting sense. The scope of the invention is determined by reference to the claims. Each part or step is assigned its own number in the specification and drawings.

Figure 1:
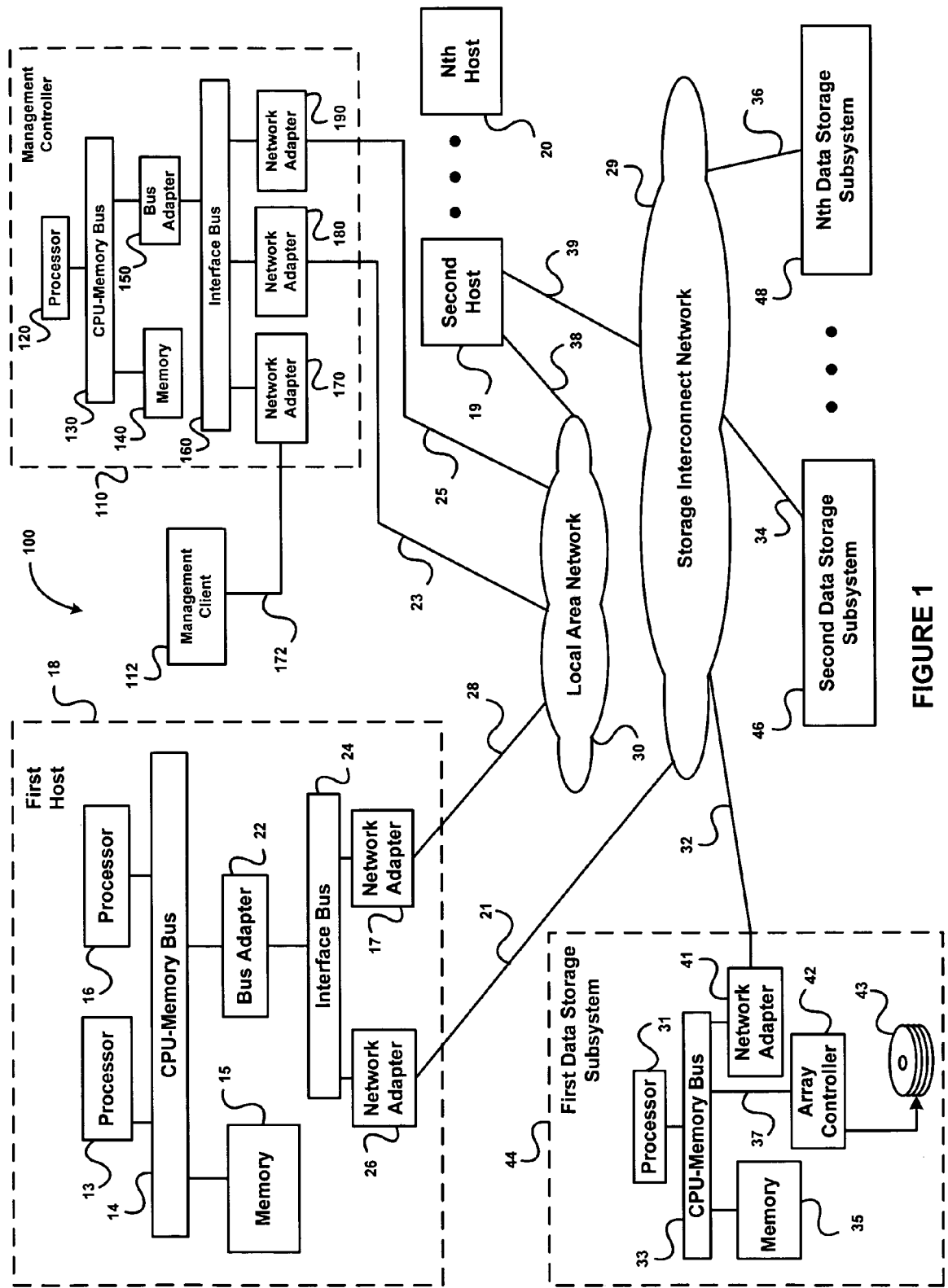
FIG. 1 illustrates a data storage system and provides details of a host, a data storage subsystem, and a management controller.

FIG. 1 illustrates a data storage system 100 that includes first through Nth hosts 18, 19 and 20, and first through Nth data storage subsystems 44, 46 and 48. Each host is a computer that can connect to clients, data storage subsystems and other hosts using software/hardware interfaces such as network interface cards and software drivers to implement Ethernet, Fibre Channel, ATM, SCSI, InfiniBand, etc. Hennessy and Patterson, *Computer Architecture: A Quantitative Approach* (2003), and Patterson and Hennessy, *Computer Organization and Design: The Hardware/Software Interface* (2004) describe computer hardware and software, storage systems, memory, caching and networks and are incorporated herein by reference.

Each host runs an operating system such as Linux, UNIX, a Microsoft OS, or another suitable operating system. Tanenbaum, *Modern Operating Systems* (2001) describes operating systems in detail and is incorporated herein by reference.

FIG. 1 shows the first host 18 includes a CPU-memory bus 14 that communicates with the processors 13 and 16 and a memory 15. The processors 13 and 16 used are not essential to the invention and could be any suitable general-purpose processor such as an Intel Pentium processor, an ASIC dedicated to perform the operations described herein, or a field programmable gate array (FPGA).

Each host includes a bus adapter 22 between the CPU-memory bus 14 and an interface bus 24, which in turn interfaces with network adapters 17 and 26. The first host 18 communicates through the network adapter 17 over link 28 with the local area network (LAN) 30 with other hosts. The first host 18 also communicates through the network adapter 26 over a link 21 with a storage interconnect network 29. Similarly, the second host 19 communicates over links 38 and 39 with the LAN 30 and the storage interconnect network 29, respectively. The storage interconnect network 29 also communicates over links 32, 34, and 36 with the data storage subsystems 44, 46, and 48, respectively. In sum, the hosts 18, 19 and 20 communicate with each other, the LAN 30 and storage interconnect network 29 and data storage subsystems 44, 46, and 48.

The LAN 30 and the storage interconnect network 29 can be separate networks as illustrated or combined in a single network, and may be any suitable known bus, SAN, LAN, or WAN technology such as Fibre Channel, SCSI, InfiniBand, or Ethernet, and the type of interconnect is not essential to the invention. See Kembel, The FibreChannel Consultant, *A Comprehensive Introduction* (1998), Kembel, The Fibre-Channel Consultant, *Arbitrated Loop* (1996-1997) The Fibre-Channel Consultant, *Fibre Channel Switched Fabric* (2001), Clark, *Designing Storage Area Networks* (2003), Clark, *IP SANs: A Guide to iSCSI, iFCP, and FCIP Protocols for Storage Area Networks* (2002) and Clark, *Designing Storage Area Networks* (1999), which are incorporated herein by reference.

FIG. 1 shows the first data storage subsystem 44 includes a CPU-memory bus 33 that communicates with the processor 31 and a memory 35. The processor 31 used is not essential to the invention and can be any suitable general-purpose processor such as an Intel Pentium processor, an ASIC dedicated to perform the operations described herein, or a field programmable gate array (FPGA). The CPU-memory bus 33 communicates through an adapter 41 and link 32 with the storage interconnect network 29 and through a link 37 to an array controller 42, such as a RAID controller, interfacing with an array of storage devices (e.g., a disk array 43).

U.S. application Ser. No.10/677,560, Systems and Methods of Multiple Access Paths to Single Ported Storage Devices, filed on Oct. 1, 2003 describes suitable data storage subsystems, each containing at least one disk array, and is incorporated by reference herein. In alternative embodiments, any suitable controller and compatible storage device(s) can be used (e.g. tape drives or semiconductor memory) in the data storage subsystem. Massiglia, *The RAID Book: A Storage System Technology Handbook* (6th Edition, 1997) describing RAID technology is incorporated by reference herein.

In an embodiment, the disk array 43 is an array of hard disk drives that use zone bit recording (ZBR) to maximize capacity by creating data zones on each disk in a manner that maximizes the areal density (linear density in bits/in. and track density in trks/in.) within each data zone. The innermost track of a disk has a finite linear bit density for recording data that is determined by several factors. Given the rotational speed of the disk drive, the bit density cannot be greater than the rate the read/write (R/W) electronics is able to write and read data. Given the dimensions of the disk, the length of the innermost track and the bit density are used to determine the capacity of that innermost track. As the R/W heads move outward from the innermost track, the radius to each subsequent track increases and, accordingly, the length of each subsequent track increases and the resulting linear bit density decreases. If the data rate were to be held constant across the entire disk surface, the outermost track would contain the same amount of data (capacity) as the innermost track, even though the outermost track is approximately twice as long as the innermost track. In order to take advantage of the increasing track length and the potential for increasing the overall capacity, the disk surface is divided into zones. At the innermost track of each zone, the linear density of the recorded data is increased to again meet the maximum linear bit density that the R/W technology allows. The tracks within each new zone contain higher data capacity than those of the previous zone as the heads move to the outer diameter of the disk. The zone boundaries may be determined by the physical format of the data. Linear densities will be readjusted upward (a new zone created) when a whole sector or multiples of whole sectors (including sector overhead), will fit on the new zone's innermost track. Typically, eight to fifteen data zones are created. ZBR provides increased performance due to the increased data capacity in each zone as the R/W heads move from the innermost zone to the outermost zone.

A host may access secondary storage devices (e.g., disk drives) through a VLUN (virtual logical unit number) that abstracts the storage device(s) as a linear array of fixed-size blocks. A logical block address (LBA) identifies each fixed-sized block. The data storage system constructs a VLUN from all or parts of several physical storage devices such as disk drives. To make a large VLUN, a data storage system may concatenate space allocated from several storage devices. To improve performance, the data storage system maps adjacent regions of VLUN space onto different physical storage devices (striping). To improve reliability, the system holds multiple copies of a VLUN on different storage devices (mirroring). In an embodiment, the term volume encompasses one or more VLUNs used to store SAN LUNs and/or file systems.

Users request write and read operations of the data storage system 100. An IT administrator can assign an archive, low, medium, or high priority for each volume to handle each type of work (e.g., archive, backup, document production, and transaction processing).

In other embodiments, the IT administrator assigns one of a plurality of priorities to each volume. Thus the IT administrator could assign a higher or lower priority to a volume. Also the term for each priority need not be labeled as "archive, low, medium, or high," but could be any suitable term that assists the user in understanding its predicted performance relative to other priorities.

In operation, a user requests an I/O operation of one of the hosts 18, 19, or 20 which will transmit the request on the LAN 30 or the storage interconnect network 29 to one or more of the data storage subsystems 44, 46, or 48.

If a write is received, the data storage subsystem 44 can use a write-through scheme and not acknowledge the write until the data is written to nonvolatile memory (e.g., disk array 43). This ensures data consistency between the host and data storage subsystem in the event of a power failure, etc.

In a write-back scheme, the data storage subsystem 44 can acknowledge the write before data is written to a disk array 43 as long as the data is stored in another form of nonvolatile memory (e.g., battery backed RAM) until written to the disk array to again ensure data consistency.

FIG. 1 illustrates one embodiment of a user interface such as a management controller 110 and the management client 112 that present the IT administrator with high level choices to configure the data storage system 100. The management controller 110 includes a CPU-memory bus 130 that communicates with a processor 120 and a memory 140. The processor 120 can be any general-purpose processor such as an Intel Pentium processor, a dedicated ASIC or FPGA. The management controller 110 also includes a bus adapter 150 between the CPU-memory bus 130 and an interface bus 160, which interfaces with network adapters 170, 180, and 190. The management controller 110 can communicate through the network adapter 180 over link 23 or link 25, the LAN 30, and the link 28 with the first host 18.

FIG. 2 illustrates the management client 112 shown in FIG. 1 may run a Web-based GUI in a browser (e.g., Microsoft Internet Explorer or Firefox) to display the high level choices available to configure the data storage system 100, while the management controller 110 communicates the high level choices in web forms using the HTTP over link 172 to the management client 112. The management client 112 shown allows an IT administrator to configure each volume by selecting: (1) NAS or SAN, (2) a capacity, and (3) a priority (e.g., high, medium, low, or archive).

Figure 3:
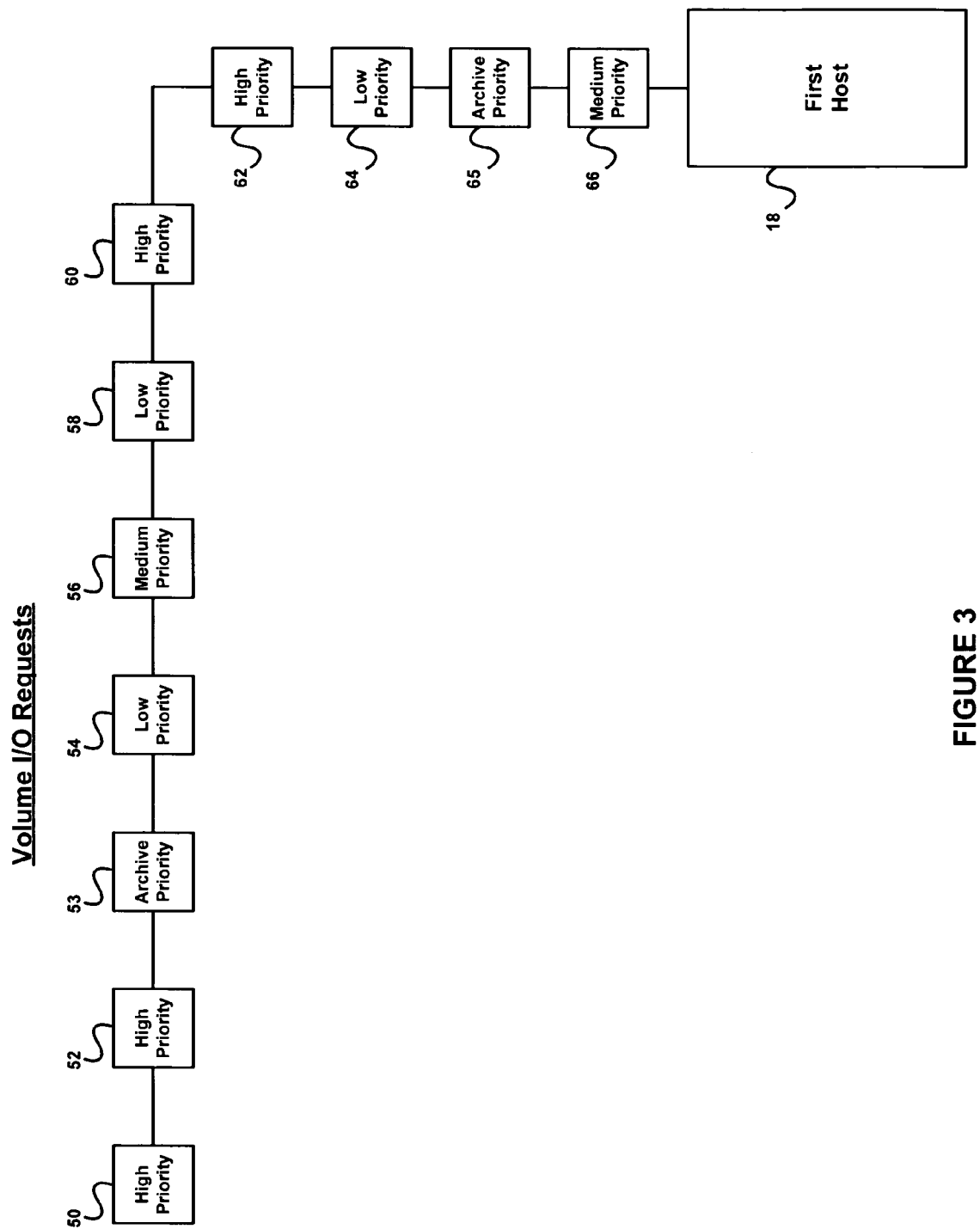
FIG. 3 illustrates I/O requests arriving in arbitrary order at a host.

FIG. 3 illustrates that the first host 18 receives I/O requests from users in no particular order. Each I/O request associates with a configured volume. As illustrated, the users of the data storage system have transmitted the following I/O requests to the first host 18:

1) a medium priority I/O request 66,
2) an archive priority I/O request 65,
3) a low priority I/O request 64,
4) a high priority I/O request 62,
5) a high priority I/O request 60,
6) a low priority I/O request 58,
7) a medium priority I/O request 56,
8) a low priority I/O request 54,
9) an archive priority I/O request 53,
10) a high priority I/O request 52, and
11) a high priority I/O request 50.

Figure 4:
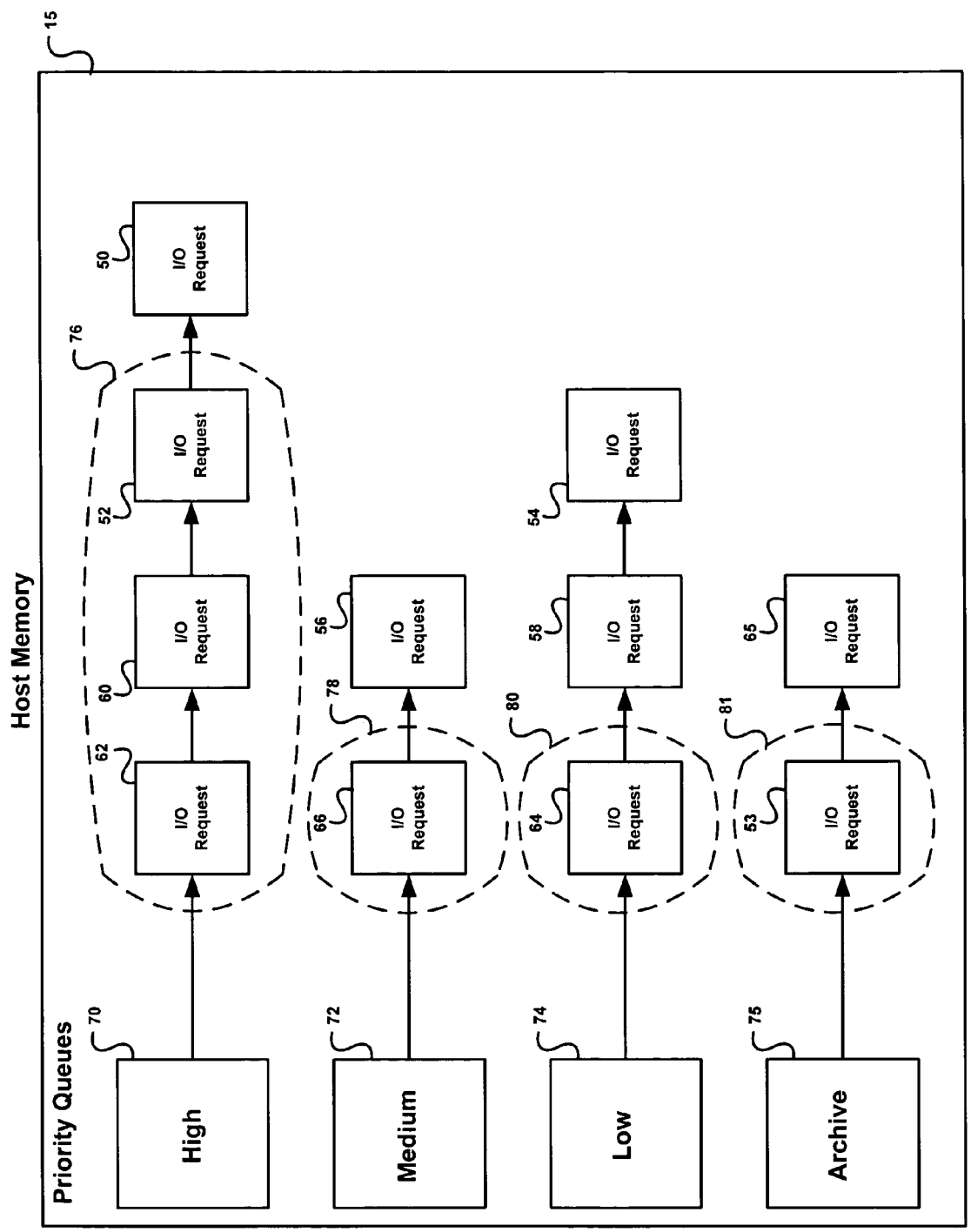
FIG. 4 illustrates I/O requests in high, medium, low, and archive priority queues in the host.

FIG. 4 illustrates the host determines the volume priority of each incoming I/O request and arranges the I/O requests in the host memory into priority queues. FIG. 4 depicts two to four I/O requests in each queue, but each queue may have more or less I/O requests. The host is shown having high, medium, low, and archive priority queues, but users' requirements may require a higher or lower number of priorities, and use other terminology. FIG. 4 depicts high priority I/O requests 50, 52, 60, 62 go into the high priority queue, medium priority I/O requests 56 and 66 go into the medium priority queue, low priority I/O requests 54, 58, and 64 go into the low priority queue, and archive priority I/O requests 53 and 65 go into the archive priority queue.

The host includes an I/O scheduler that periodically sweeps through the I/O request queues to pick up new I/O requests to send to the data storage subsystems 44, 46, or 48 (FIG. 1). In an embodiment, the data storage subsystems send an acknowledgment to the host to indicate availability for processing the new I/O requests. The I/O scheduler selects I/O requests from each priority's queue according to the table that follows. For example, if the I/O scheduler is ready to process additional I/O requests, it preferentially selects higher priority I/O requests as indicated by dotted line 76, and an I/O request from each of the medium, low, and archive priority queues as indicated by, respectively, dotted lines 78, 80, and 81. In a normally loaded data storage system, there is often more I/O requests queued and the I/O scheduler selects more I/O requests on each sweep through the queues.

The I/O scheduler looks up the volume priority of each I/O request in a table and tags each I/O request with its priority and transmits the I/O requests in batches to the data storage subsystems in order of priority. In an embodiment, the priority of each I/O request is set in a bit field. The width of the bit field determines the possible levels of priority. In an embodiment, the bit field is a command descriptor block (CDB) of a SCSI command and the three-bit field of the CDB represents up to eight priorities.

Figure 5:
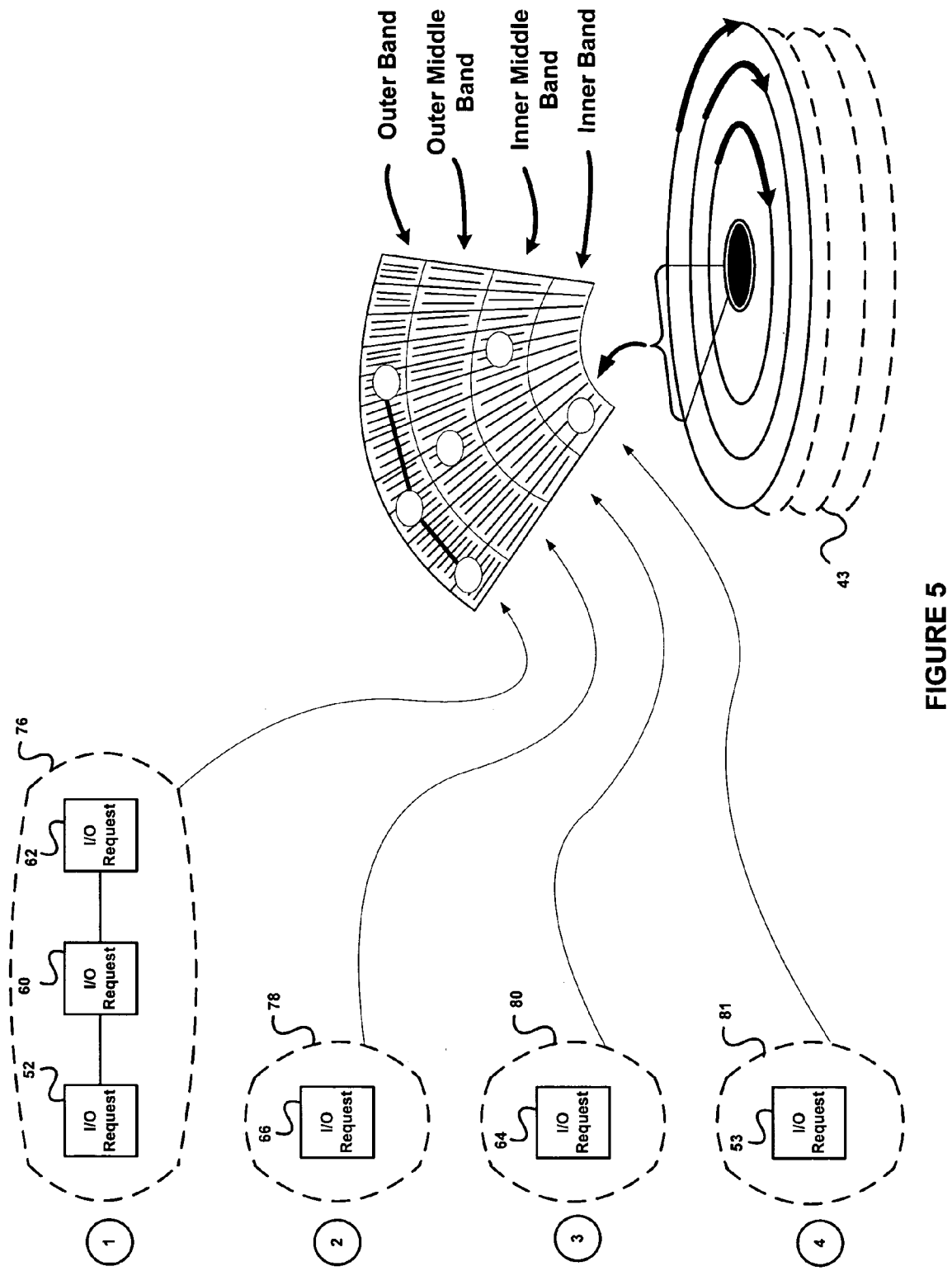
FIG. 5 illustrates high, medium, low, and archive priority I/O requests arranged in the performance bands of a disk drive.

As illustrated by FIGS. 1 and 5, the host sends a batch 76 of high priority I/O requests 52, 60, and 62 to the data storage subsystem 44. Once received, the array controller 42 processes the high priority batch by accessing a high performance band of a storage device such as the outermost band of at least one disk drive of disk array 43. Next, the host sends medium priority I/O request 78, low priority I/O request 80, and archive priority I/O request 81 to the data storage subsystem 44. Again, the array controller 42 processes the I/O requests according to performance bands, for example, by accessing, respectively, the outer middle band, the inner middle band, and the inner band of the disk drive(s).

In another embodiment, each data storage subsystem uses the techniques described in U.S. application Ser. No. 10/976, 430, Management of I/O Operations in Data Storage Systems, filed on Oct. 29, 2004 to retain the priority ordering of I/O requests to the storage devices (e.g., disk drives). Therefore, the storage devices preferentially service the high priority requests over medium priority requests. Likewise, the storage devices preferentially service the medium priority requests over low priority requests and so forth. The data storage subsystem uses this ordering to minimize seek between the performance bands of the storage device.

In another embodiment, within each priority, the data storage subsystem sorts the I/O requests according to known disk drive arm scheduling algorithms to reduce seek time. In an embodiment, at the end of a cycle of priority work, the data storage subsystem seeks the disks back to their outer diameters to perform or to be ready to perform high priority requests again.

Figure 6:
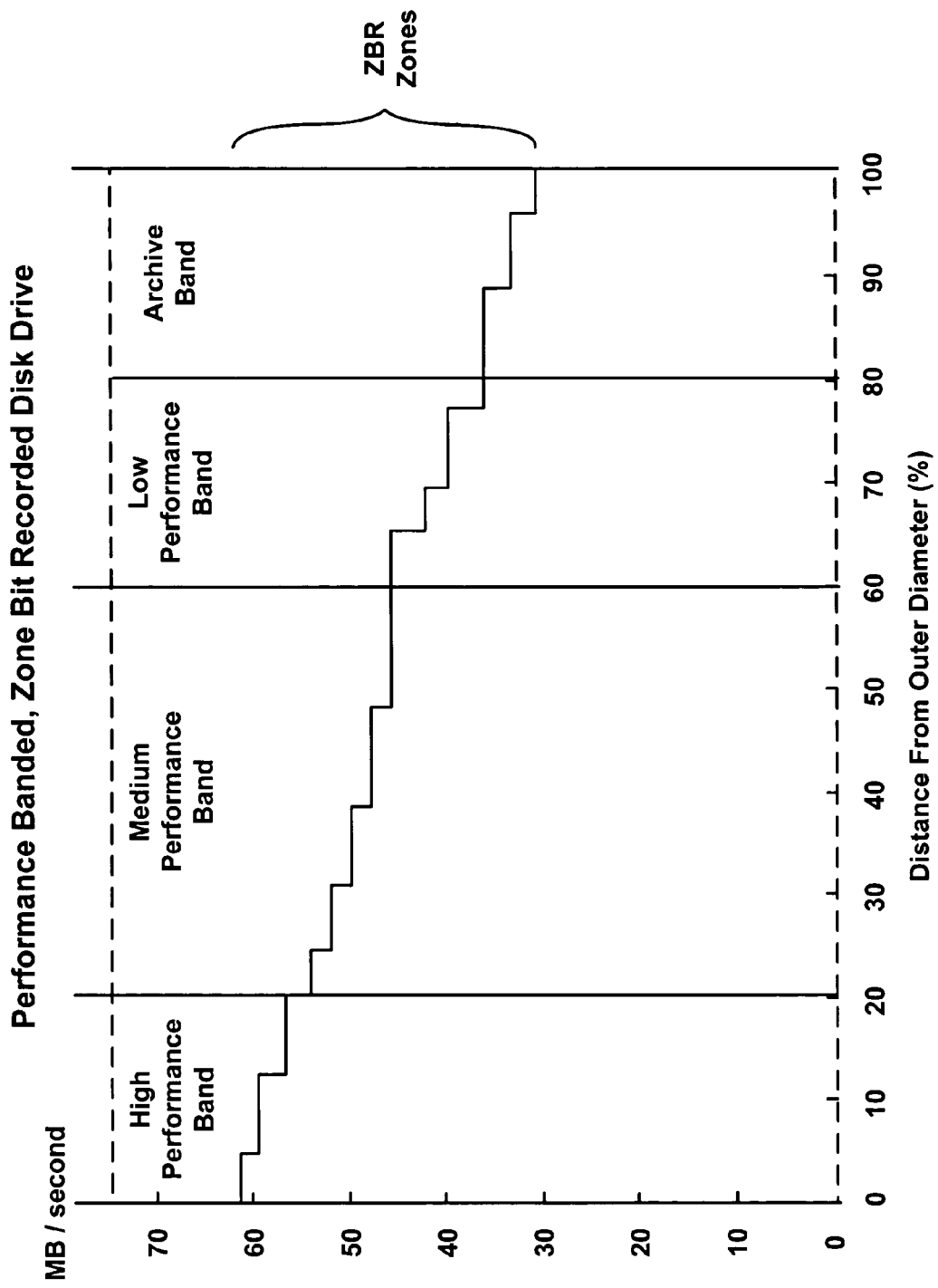
FIG. 6 shows high, medium, low, and archive performance bands with respect to hard disk drive data rate as a function of track placement across the disk drive.

Thus, the invention takes advantage of performance characteristics of disk drive geometry. For sequential I/O, a disk drive can read or write from the outer diameter approximately twice as fast as it can read or write from the inner diameter. Disk drives store more data per track at the outer diameter and run at a constant rotational velocity; therefore, the data rate scales with the track capacity. FIG. 6 illustrates how the performance bands can be arranged on a curve showing sequential read data rate on a disk from outer to inner diameter. A performance band is a contiguous collection of data zones. The performance band can align or not align with data zone boundaries. In many embodiments, we illustrate the invention with four performance bands (e.g., high, medium, low, or archive). However, the number of performance bands can be two or more depending on the user requirements. Thus, the invention encompasses a plurality of performance bands.

For random I/O, a disk drive reads or writes about 8% faster at the outer diameter than at the inner. Applications can achieve yet higher random I/O rates by confining access to a small portion of the disk drive. For example, confining access to 5% of a disk drive can produce 1.6 times the random I/O throughput as using the entire disk drive. Generally, seek times on disk drives increase with the square root of the seek distance. By keeping the seek distance low, a data storage system improves random I/O performance.

With regard to quality of service I/O scheduling, to retain the high performance of the outer bands of the disk drives, the data storage system limits or eliminates seek activity to the other performance bands. The data storage system schedules I/O requests according to priority to enforce the allocation of I/O bandwidth selected by the administrator. To achieve the objectives, the data storage system queues I/O requests by priority and selects I/O requests to send to the data storage subsystems according to target percentages of use. The table below lists some illustrative priorities and desired allocation of I/O requests to each priority:

| Priority of I/O Request | Band of Disk Drive | % of I/O |
|---|---|---|
| High | Outer 20% | 50% |
| Medium | 20% to 60% | 35 |
| Low | 60% to 80% | 10 |
| Archive | Inner 20% | 5 |

The "band of disk drive" column represents the allocation of capacity on each disk drive. The outermost 20% of the disk drive goes to high priority, the next 40% goes to medium priority, and so forth. It should be understood that the number of priorities, the proportion of the disk allocated, and the percentage of I/O allocated will vary from user to user. For example, the number of priorities can be a plurality, that is, two or more. It depends on types of application, the performance requirements of the applications, and the frequency of use of the applications. Thus, the user should be able to add or delete a priority, change the portions of the disk dedicated to a priority, and the percent of I/O after operations reveal better configurations.

The data storage subsystems address the performance bands through logical block addresses (or LBAs) of the disk drives. LBAs on a disk drive start at zero on the outer diameter and increase up to the capacity of the disk drive, with the highest LBA on the inner diameter of the disk drive. Therefore performance bands correspond to ranges of LBAs on the disk drives.

The "% of I/O" column represents the minimum fraction of the I/O requests that the priority gets. For example, if the data storage system needs to gather 100 I/O requests, then it takes at least 50 high priority requests (if it has that many), 35 medium priority requests, and so forth. In order to not "hang" the host while waiting for sufficient I/O requests to match each of the prescribed % allocations, system timers allow the execution of accumulated I/O requests after reasonable wait periods. The host transmits the I/O requests to the data storage subsystem when the I/O requests meet the batch size but if the I/O requests count does not reach the batch size by a maximum dwell time, the host transmits I/O requests to the data storage subsystem to avoid delay.

The host can also weight the allocation of I/O requests to priorities by the number of volumes assigned to each priority. For example, if high priority is 50% and archive priority 5% of I/O bandwidth, and you have one high priority volume and 20 volumes of archive priority, the host will weight the allocation as follows:
High: 50%×1 volume=50%
Archive: 5%×20 volumes=100%
Total=150%
Normalizing the results you have as follows:
High: 50/150=33.3%
Archive: 100/150=66.7%

In another embodiment, the host may weight the allocation of I/O requests only to volumes that are recently active (e.g., I/O requests received in the last five minutes) in each priority. Each host receives I/O requests from users running applications and translates I/O requests to read or write blocks in a volume into I/O requests to blocks in the data storage subsystems. In an illustrative embodiment, each translated I/O request contains:

| Field | Data Type | Meaning |
|---|---|---|
| Enclosure LUN | 48-bits | World-wide name of target enclosure LUN |
| LBA | 64-bits | Logical block address in the LUN |
| Length | 32-bits | Number of 512-byte blocks |
| Operations | 32-bits | Read, write, or status inquiry |
| Buffer | 64-bits | Physical address of the data in host memory |
| Priority | 8-bits | Priority (high, medium, low, or archive) |

Figure 7:
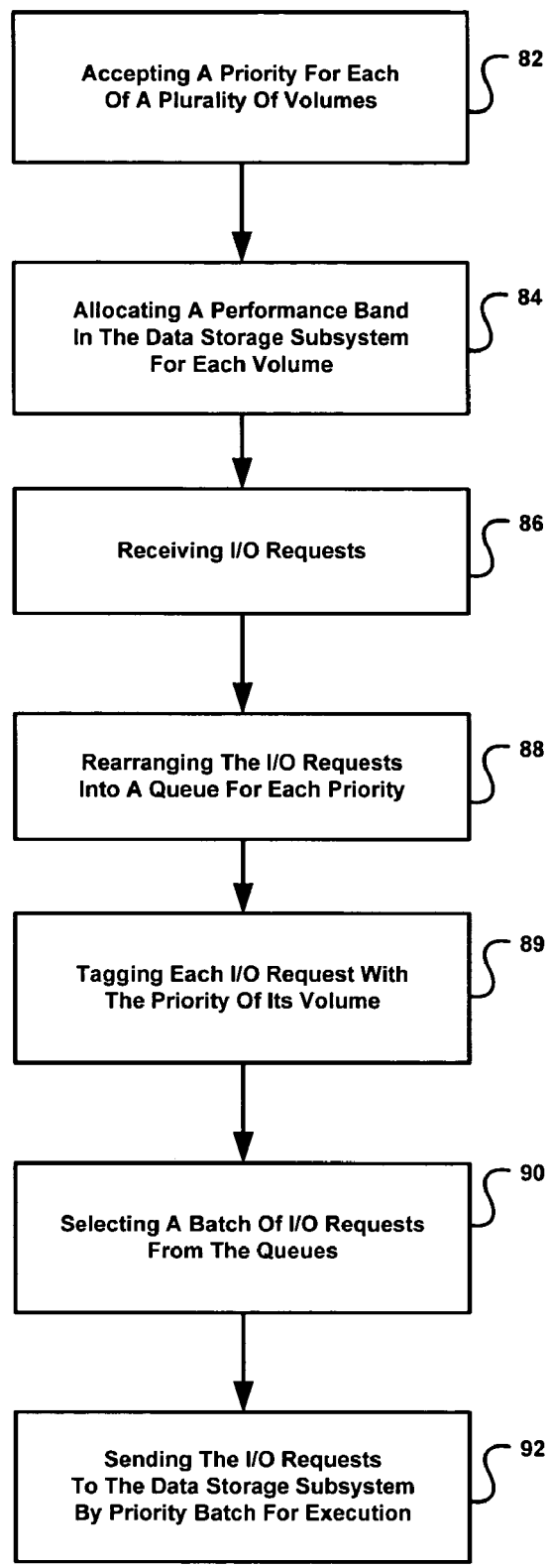
FIG. 7 illustrates a method implemented in a data storage system to handle I/O requests in accordance with quality of service priorities.

FIG. 7 illustrates a method of processing I/O requests in a data storage system. At step 82, the management client presents a user interface (e.g., FIG. 2) such as a Web form for accepting a priority for each of a plurality of volumes. The web form can accept and pass the volume definition as parameters using HTTP to the management controller. At step 84, the host allocates a plurality of performance bands according to the priorities as described earlier. For example, the host will allocate a range of LBA that correspond to each performance band of a hard disk drive. At step 86, the host receives I/O requests in arbitrary order, and rearranges the I/O requests into a queue for each priority at step 88. At step 89, the host tags I/O requests by priority. At step 90, the host selects a batch of I/O requests from the queues. At step 92, the host sends the batch of I/O requests to a data storage subsystem for execution.

Figure 8:
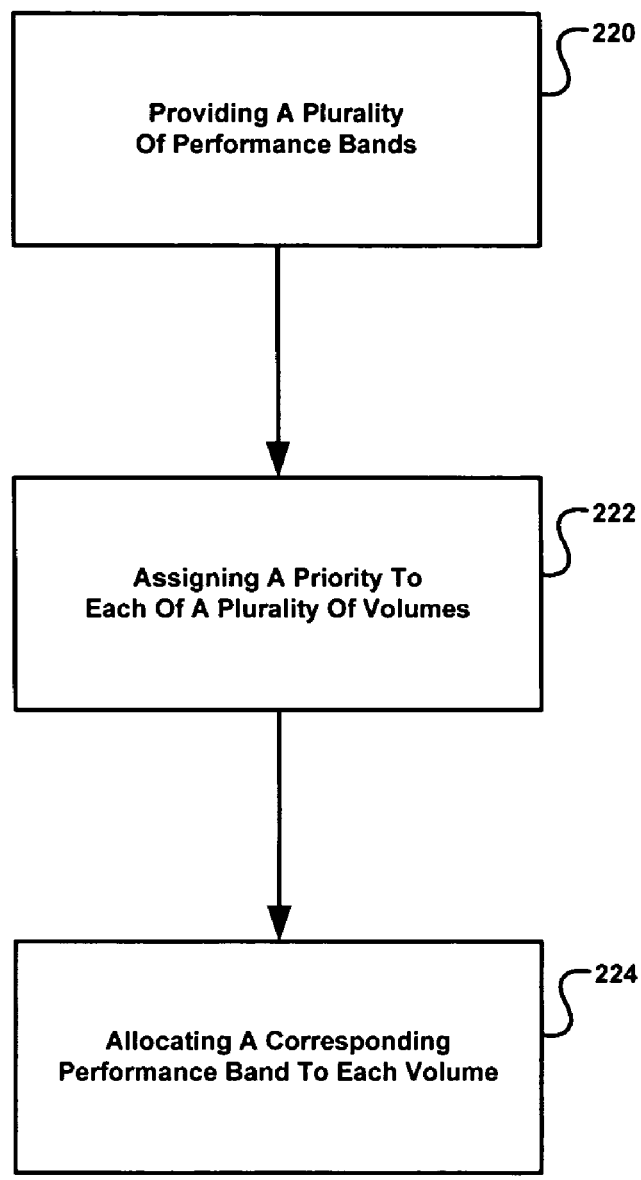
FIG. 8 illustrates a method of allocating performance bands to a data zone bit recorded disk drive of a data storage system.

FIG. 8 illustrates a method of allocating performance bands to a data zone bit recorded disk drive of a data storage system. At step 220, the host provides a plurality of performance bands in the data zone bit recorded disk. At step 222, the host assigns a priority to each of a plurality of volumes in the data storage system. At step 224, the host allocates a corresponding performance band to each volume.

In conclusion, many features of the invention were illustrated using the terms high, medium, low, and archive. The terms are not essential to the invention and other names can be used. The terms are only intended to distinguish the priority of the volumes, I/O requests, queues, and performance bands, not to supply a numerical limit or suggest that the priorities could not be identified with other terms.

What is claimed is:

1. A data storage system for processing I/O requests, comprising:

a user interface accepting a priority for each of a plurality of volumes, wherein each volume is a LUN or file system;

a data storage subsystem, including a zone bit recorded disk drive; and a host adapted to allocate a performance band on the zone bit recorded disk drive in the data storage subsystem for each volume, receive I/O requests, rearrange the I/O requests into queues for each priority, tag each I/O request with the priority of its volume, selects batch of I/O requests by priority from the queues, and send the I/O requests to the data storage subsystem by priority batches for execution.

2. The system of claim 1, wherein the user interface is a Web-based graphical user interface communicating with a management controller.

3. The system of claim 1, wherein the user interface allows a person to define each volume by assigning priority, as NAS or SAN, and of a certain capacity.

4. The system of claim 1, wherein the priority is high, medium, low, or archive.

5. The system of claim 4, wherein the data storage subsystem includes performance bands on a zone bit recorded disk drive, wherein the high priority I/O requests go on an outer band.

6. The system of claim 4, wherein the data storage subsystem includes performance bands on a zone bit recorded disk drive, wherein the low priority I/O requests go on an inner band.

7. The system of claim 1, wherein the host selects I/O requests from each of a high, medium, low, and archive queue.

8. The system of claim 1, wherein the host tags the I/O requests with their priority and transmits them as a batch to the data storage subsystem in order of priority.

9. The system of claim 8, wherein the data storage subsystem retains the I/O requests in order of priority.

10. The system of claim 8, further comprising another host sending I/O requests to the data storage subsystem, wherein the data storage subsystem retains the I/O requests in order of priority.

11. The system of claim 1, wherein the I/O request bandwidth of the data storage subsystem is allocated by priority.

12. The system of claim 1, wherein each priority is assigned a minimum percentage of I/O requests.

13. The system of claim 1, wherein the I/O request bandwidth of the data storage subsystem is allocated by priority and by weighting each of the volumes.

14. The system of claim 1, wherein the boundary of each performance band aligns with a data zone boundary on the zone bit recorded disk drive.

15. The system of claim 1, wherein the boundary of each performance band does not align on a data zone boundary on the zone bit recorded disk drive.

16. A method of processing I/O requests in a data storage system, comprising;

accepting a priority for each of a plurality of volumes, wherein each volume is a LUN or a file system';

allocating a plurality of performance bands 'of a zone bit recorded disk drive' according to the priorities;

receiving I/O requests;

rearranging the I/O requests into a queue for each priority, selecting a batch of I/O requests from the queues; and executing the batch of I/O requests.

17. A method of processing I/O requests in a data storage system, comprising:

providing a plurality of performance bands for a zone bit recorded disk drive;

assigning a priority to each of a plurality of volumes;

allocating a performance band for each volume;

receiving I/O requests;

a rearranging the I/O requests into a queue for each priority, tagging I/O requests by priority;

selecting a batch of I/O requests from the queues; and sending the I/O requests by priority batch to the data storage subsystem for execution.

18. The method of claim 17, wherein the boundary of each performance band aligns with a data zone boundary of the zone bit recorded disk drive.

19. The method of claim 17, wherein the boundary of each performance band does not align on a data zone boundary of the zone bit recorded disk drive.

20. A data storage system for processing I/O requests, comprising:

a user interface accepting a priority for each at a plurality of volumes;

a data storage subsystem; and a host adapted to allocate a performance band in the data storage subsystem for each volume, receive I/O requests, rearrange the I/O requests into queues for each priority, tag each I/O request with the priority of its volume, select a batch of I/O requests by priority from the queues, and send the I/O requests to the data storage subsystem by priority batches for execution, wherein the data storage subsystem includes performance bands on a zone bit recorded disk drive, wherein the higher priority I/O requests execute on the outer bands.

21. A data storage system for processing I/O requests, comprising:

a user interface accepting a priority for each of a plurality of volumes;

a data storage subsystem; and a host adapted to allocate a performance band in the data storage subsystem for each volume, receive I/O request, rearrange the I/O requests into queues for each priority, tag each I/O request with the priority of its volume, select a batch of I/O requests by priority from the queues, and send the I/0 requests to the data storage subsystem by priority batches for execution, wherein the data storage subsystem includes performance bands on a zone bit recorded disk drive, wherein the lower priority I/O requests execute on the inner bands.

22. A data storage system for processing I/O requests, comprising:

a user interface accepting a priority for each of a plurality of volumes;

a data storage subsystem; and a host adapted to allocate a performance band in the data storage subsystem for each volume, receive I/O requests, rearrange the I/O requests into queues for each priority, tag each I/O request with the priority of its volume, select a batch of I/O requests by priority from the queues, and send the I/O requests to the data storage subsystem by priority batches for execution, wherein a boundary of each performance band aligns with a data zone boundary on a zone bit recorded disk drive.

* * * * *